United States Patent
Naik et al.

(10) Patent No.: US 7,899,928 B1
(45) Date of Patent: Mar. 1, 2011

(54) EFFICIENT MULTICAST PACKET HANDLING IN A LAYER 2 NETWORK

(75) Inventors: Chickayya Naik, San Jose, CA (US); Giovanni Meo, San Francisco, CA (US); Karthikeyan Gurusamy, San Jose, CA (US); Mouli Vytla, San Jose, CA (US); Senthilkumar Krishnamurthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1409 days.

(21) Appl. No.: 10/738,383

(22) Filed: Dec. 16, 2003

(51) Int. Cl.
*H04L 12/66* (2006.01)
*G06F 15/173* (2006.01)

(52) U.S. Cl. .................. 709/238; 709/242; 709/239
(58) Field of Classification Search ............. 709/238; 370/256
See application file for complete search history.

(56) References Cited

U.S. PATENT DOCUMENTS

| | | | |
|---|---|---|---|
| 5,079,767 A * | 1/1992 | Perlman .................. 370/408 |
| 6,331,983 B1 * | 12/2001 | Haggerty et al. ............ 370/400 |
| 6,347,090 B1 | 2/2002 | Ooms et al. |
| 6,538,997 B1 * | 3/2003 | Wang et al. .................. 370/241 |
| 6,570,881 B1 * | 5/2003 | Wils et al. .................... 370/410 |
| 6,578,086 B1 * | 6/2003 | Regan et al. ................. 709/242 |
| 6,597,703 B1 | 7/2003 | Li et al. |
| 6,785,274 B2 | 8/2004 | Mahajan et al. |
| 6,879,594 B1 * | 4/2005 | Lee et al. ..................... 370/408 |
| 2003/0065814 A1 * | 4/2003 | Ishii ........................... 709/239 |
| 2003/0067928 A1 * | 4/2003 | Gonda ........................ 370/401 |
| 2005/0041680 A1 * | 2/2005 | Tanaka et al. ............... 370/432 |
| 2005/0080901 A1 * | 4/2005 | Reader ........................ 709/226 |
| 2005/0157741 A1 * | 7/2005 | Wu et al. ..................... 370/432 |
| 2008/0181224 A1 * | 7/2008 | Van Hensbergen et al. .. 370/389 |
| 2008/0239957 A1 * | 10/2008 | Tokura et al. ............... 370/235 |

OTHER PUBLICATIONS

D. Estrin et al., "Protocol Independent Multicast-Sparse Mode (PIM-SM): Protocol Specification", RFC 2362, Internet Engineering Task Force, Jun. 1998.
B. Fenner et al., "Protocol Independent Multicast—Sparse Mode (PIM-SM): Protocol Specification (Revised)", Internet Draft, Internet Engineering Task Force, Mar. 1, 2002.
W. Fenner, "Internet Group Management Protocol, Version 2", RFC 2236, Internet Engineering Task Force, Nov. 1997.
M. Handley et al., "Bi-directional Protocol Independent Multicast (BIDIR-PIM)", Internet Draft, Internet Engineering Task Force, Jun. 2002.

* cited by examiner

*Primary Examiner* — Jeffrey Pwu
*Assistant Examiner* — Sulaiman Nooristany
(74) *Attorney, Agent, or Firm* — Cindy Kaplan

(57) ABSTRACT

Efficient multicasting within a layer 2 network is provided. Participation by a layer 3 router is not required. The spanning tree created by common layer 2 networking protocols is exploited for multicast signaling and traffic handling.

18 Claims, 7 Drawing Sheets

EFFICIENT MULTICAST PACKET HANDLING IN A LAYER 2 NETWORK

BACKGROUND OF THE INVENTION

The present invention relates to data networking and more particularly to systems and methods for handling multicast traffic.

Multicast routing techniques have been developed to support a demand for applications such as audio and video conference calls, audio broadcasting, and video broadcasting. In multicast routing, a host sends packets to a subset of all hosts as a group transmission. Multicast routing protocols have been developed to conserve bandwidth by minimizing duplication of packets. To achieve maximum efficiency in delivery of data, rather than being replicated at the source, multicast packets are replicated at the point where paths to multiple receivers diverge.

Multicast techniques have been developed in the context of layer 3 routing technology. Fairly complex protocols have been developed to establish multicast distribution paths so that multicast packets reach interested receivers but do not propagate where they are not needed.

These layer 3 techniques are, however, not applicable to multicast operation within strictly layer 2 networks. In the past, layer 2 networks have been of fairly small scale, e.g., small LANs. Now however, a layer 2 network may include a very large mesh of layer 2 switches. Through tunneling technology, a virtual LAN (VLAN) can be established over a very wide area. There is thus now a desire to push multicast traffic through these large layer 2 networks.

The most common solution is to simply flood the multicast traffic throughout the layer 2 network. This is a highly inefficient use of network resources. Another class of solutions mandates the use of a layer 3 router in direct connection with one of the switches of the layer 2 network. Any layer 3 router switch desiring to receive multicast traffic send join messages towards this router. This layer 3 router is the attraction point for all multicast traffic and the switch that is directly connected to it becomes a common relay point between sources and receivers. This leaves little flexibility in distributing the burden of multicast traffic handling.

SUMMARY OF THE INVENTION

Embodiments of the present invention provide efficient multicasting within a layer 2 network. Participation by a layer 3 router is not required. The spanning tree created by common layer 2 networking protocols is exploited for multicast signaling and traffic handling.

A first aspect of the present invention provides a method for distributing multicast traffic in a layer 2 network. The method includes: forming a multicast distribution tree based on a spanning tree defined within the layer 2 network and forwarding multicast traffic via the multicast distribution tree.

A second aspect of the present invention provides a method for operating a node in a layer 2 network to handle multicast traffic. The method includes: receiving, via a first port, a join message for a multicast distribution group, establishing state information for the multicast distribution group if such state information has not already been established, and adding the first port to a port list associated with the state information, the port list being used to select ports for forwarding received multicast traffic of the multicast distribution group.

A third aspect of the present invention provides a method for operating a node in a layer 2 network to handle multicast traffic. The method includes: receiving multicast traffic addressed to a multicast distribution group and sending the multicast traffic toward a root bridge via a spanning tree of the layer 2 network.

A fourth aspect of the present invention provides a method for operating a node in a layer 2 network to handle multicast traffic. The method includes: receiving multicast traffic addressed to a multicast distribution group and forwarding the multicast traffic via one or more ports via which a join message was received earlier.

A fifth aspect of the present invention provides a method for operating a node in a layer 2 network to handle multicast traffic. The method includes: receiving, via a first port, an advertisement message identifying an attraction point for multicast traffic addressed to a multicast distribution group and propagating the advertisement message further through the layer 2 network via a spanning tree of the layer 2 network.

Further understanding of the nature and advantages of the inventions herein may be realized by reference to the remaining portions of the specification and the attached drawings.

DESCRIPTION OF SPECIFIC EMBODIMENTS

Figure 1:
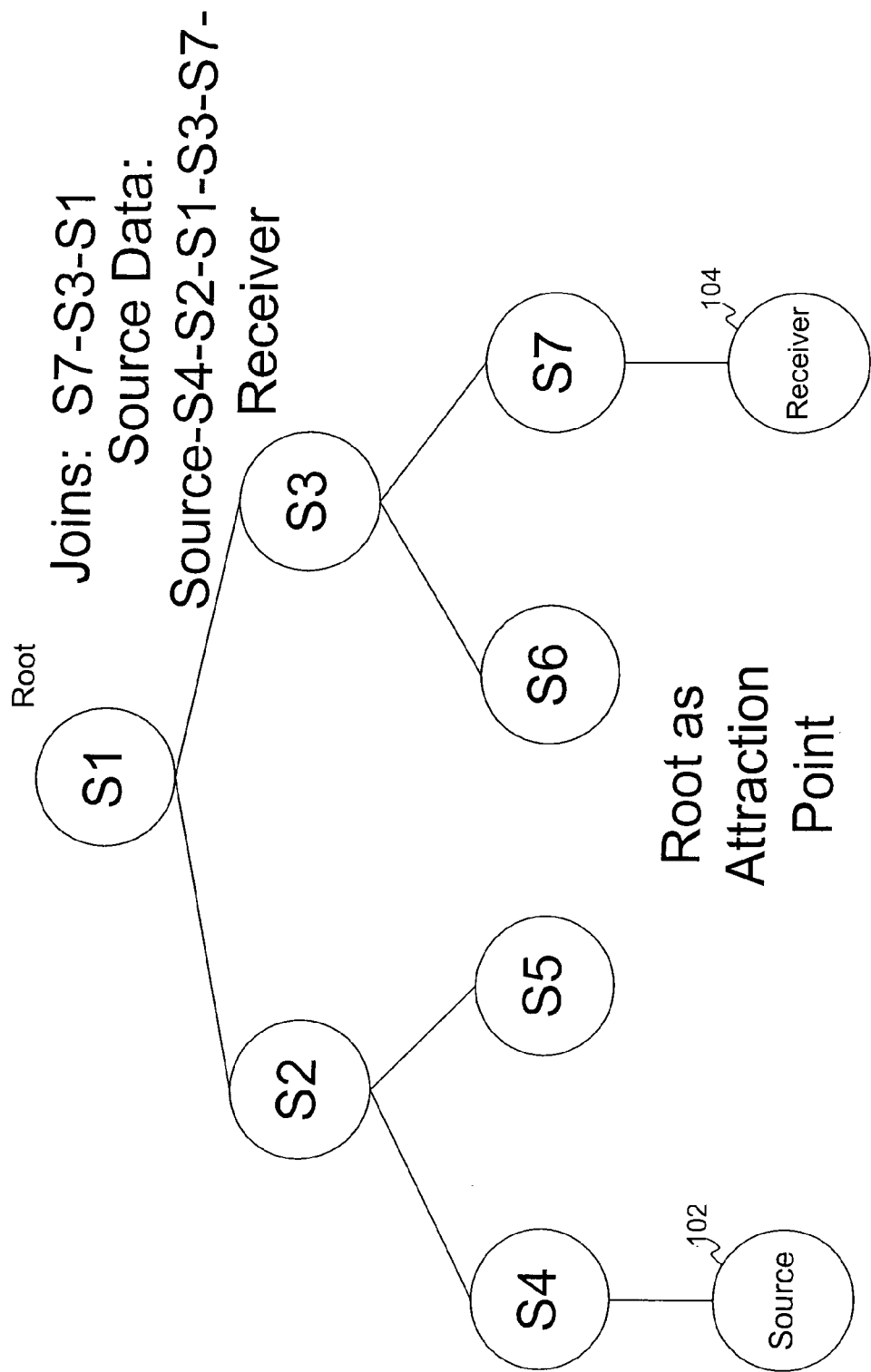
FIG. 1 depicts a spanning tree useful in illustrating a first embodiment of the present invention.

The present invention will be described with reference to a representative layer 2 network environment. The layer 2 network operates in accordance with common layer 2 networking standards such as IEEE 802.1 and 802.3. In accordance with the 802.1 standard, packets are typically transferred via a spanning tree. The spanning tree is a reduction of the layer 2 network mesh constructed such that packets may be forwarded across the network without any looping. The spanning tree is constructed in accordance with Spanning Tree Protocol (STP), a part of the IEEE 802.1 standard. In accordance with STP, all the nodes in the layer 2 network share a common understanding of the loop-fee spanning tree.

Where terms such as layer 2 network and local area network are used herein, it should be understood that these also include virtual local area networks (VLANs). Nodes that are understood at layer 2 to be directly connected may in fact be connected via a tunnel across another type of network such as a layer 3 network.

Embodiments of the present invention operate in the context of multicast traffic principles that have been developed for layer 3 routing. Embodiments of the present invention dynamically create a multicast distribution tree to ensure distribution to intended receivers while limiting distribution so that network segments that are not in the path between the source and receivers are not burdened with unnecessary traffic. Multicast operation, as described herein, is based on the concept of a group. A multicast group is an arbitrary group of receivers that expresses an interest in receiving a particular data stream. In the layer 2 context a MAC (media access control) address will be assigned to each such multicast distribution group.

In order to dynamically create distribution trees, embodiments of the present invention exploit IGMP Join messages which are sent from an interested receiver towards an attraction point within the layer 2 network (AP). IGMP is defined by Fenner, "Internet Group Management Protocol Version 2," Request for Comments 2236, Internet Engineering Task Force, November 1997, the contents of which are herein incorporated by reference in their entirety for all purposes.

The description that follows presents three representative embodiments of the present invention. In a first embodiment, the root bridge of a layer 2 network as defined by the operative STP is selected as the attraction point. In a second embodiment, the attraction point is the last-hop switch, i.e., the switch that is directly connected to the receiver. In a third embodiment, the attraction point is the first-hop switch, i.e., the switch that is directly connected to the source. These embodiments are merely representative.

Root Bridge as Attraction Point

In this embodiment, receivers and senders meet through the root bridge which is the root of the spanning tree. Interested receivers forward their IGMP Joins towards the root which does not propagate them further. Data traffic is always sent up towards the root. Conceptually, the operation of this embodiment is similar to that offered by Bi-Dir PIM (Bi-Directional Protocol Independent Multicasting) in layer 3 networks. In the context of layer 3 routing, Bi-Dir PIM has beneficial characteristics. Routers of a multicast distribution tree need to store relatively little state information to support the tree. State is established only on the downstream branch from a Rendezvous Point to a last-hop router before the receiver. Unlike many other multicast routing schemes, Bi-Dir PIM packet forwarding events do not affect the control plane, i.e., they do not result in changes to the forwarding tables. This reduces the complexity of router implementation. A large part of the complexity of the Bi-Dir PIM scheme lies instead in the need to elect "Designated Forwarders" to insure a loop-free distribution tree.

According to embodiments of the present invention, the spanning tree that already exists in the layer 2 network is used as the basis for layer 2 multicast forwarding. This greatly reduces implementation complexity compared to Bi-Dir PIM.

FIG. 1 depicts a spanning tree in a local area network. The actual network is a mesh but FIG. 1 depicts the spanning tree that has been established on this mesh. In an example multicast scenario, traffic is sent from a source 102 to a receiver 104. This simple scenario is presented for clarity of explanation and it is of course recognized that the typical multicast scenario involves multiple receivers. The spanning tree further includes nodes S1 through S7. Node S1 is the root bridge, i.e., the root node of the spanning tree. Receiver 104 is interested in joining a multicast distribution group G for which source 102 provides traffic. Accordingly, receiver 104 sends an IGMP Join message, the propagation of which will now be explained.

Figure 2:
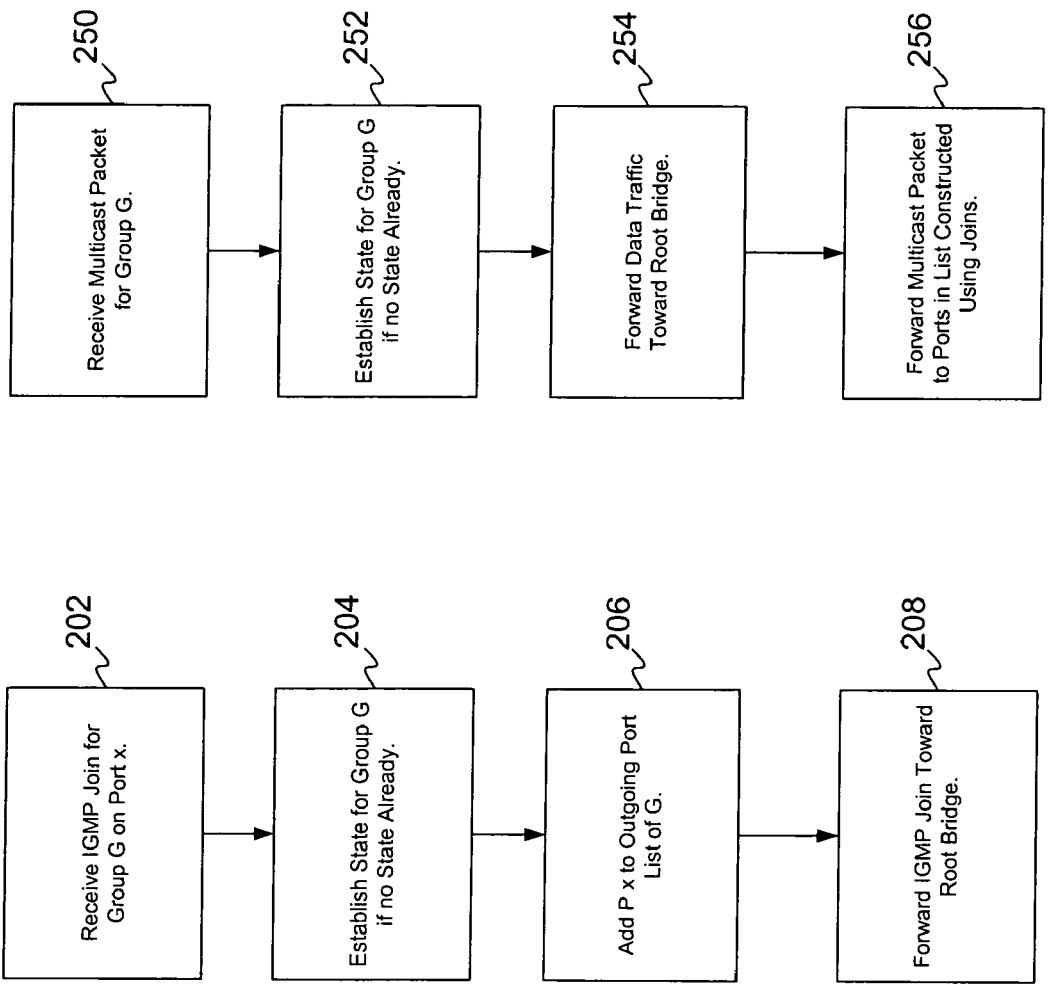
FIG. 2A is a flow chart describing steps of handling a received join message according to a first embodiment of the present invention.
FIG. 2B is a flow chart describing steps of handling a received multicast packet according to a first embodiment of the present invention.

FIG. 2A is a flow chart describing steps of handling a join message at a particular switch within a spanning tree of FIG. 1. At step 202, the switch receives an IGMP Join message for a group G on a port x. This is an indication of downstream interest in receiving multicast traffic of G. At step 204, the switch establishes state for multicast distribution group G if there is no state that has been established already. There will now be a forwarding entry for G. Associated with this forwarding entry, there is an outgoing port list for G. This list will be used to identify the ports on which to forward received packets addressed to G. At step 206, port x is added to this outgoing port list. At step 208, the received IGMP Join message is forwarded towards the root bridge. The switch knows which port to use to forward towards the root bridge based on its knowledge of the topology of the spanning tree. Thus as the Join message propagates towards the root bridge, the intervening switches add state for the group of interest.

Preferably, IGMP report suppression techniques are used so that redundant Joins from multiple downstream switches are not forwarded upstream. Each intervening switch need only forward one Join message upstream during a "keep-alive" interval to maintain distribution to itself and interested descendants on the spanning tree. This mechanism can be used in conjunction with all of the embodiments.

The multicast packets themselves are forwarded towards the root bridge based on knowledge of the spanning tree held by the intervening nodes. Then the multicast packets are forwarded downstream towards intended receivers based on the state built up by the Join messages.

FIG. 2B is a flow chart describing steps of forwarding a multicast packet. At step 250, a switch receives a multicast packet that is addressed to G. At step 252, forwarding state (e.g., a forwarding table entry) is created for G, if no state exists already. At step 254, the multicast packet is forwarded towards the root bridge via a port selected in accordance with the known spanning tree topology. At step 256, the multicast packet is also forwarded on all ports on the outgoing port list of G referred to earlier in connection with step 206. Steps 254 and 256 can be combined by using an integrated outgoing port list that includes the port that points toward the root bridge.

Referring now to the example of FIG. 1, it can be seen that a Join message from receiver 104 will propagate through switches S7 and S3 to root node S1 which will terminate Join message propagation. The data itself will propagate from source 102 through switches S4, S2, S1, S3, and S7 on its way to receiver 104.

Thus when a receiver sends an IGMP Join, state is created in the path leading from the last-hop switch to the root switch only. The state will time out unless kept alive by periodic IGMP Joins. When a source starts traffic, the first-hop switch creates state and propagates the traffic towards the root bridge. As it flow towards the root bridge, state is created on the intermediate switches. The traffic then flows down from the root bridge along pre-constructed branches to any interested receivers.

This multicast routing technique avoids flooding or the need for the participation of a layer 3 router. To substitute for the querying role of an IGMP router in stimulating the transmission of Join messages, any node in the network may act to transmit IGMP queries. This querying mechanism may be used in connection with any of the described embodiments.

The just-described technique has the beneficial characteristics of Bi-Dir PIM and avoids its complexity of implementation by exploiting the available spanning tree. Relatively few resources are required to maintain state on the switches. A large number of sources may be readily accommodated because traffic can flow upward from the sources towards the root bridge without prior state creation. Also, the use of a single attraction point, the root bridge, simplifies the design and enhances ease of troubleshooting.

Last-Hop as Attraction Point (Flooded Joins)

In a second embodiment, IGMP Joins are flooded in a layer two network via the spanning tree. Data traffic flows only to receivers who have indicated interest. Effectively, every switch acts as a potential attraction point.

Figure 3:
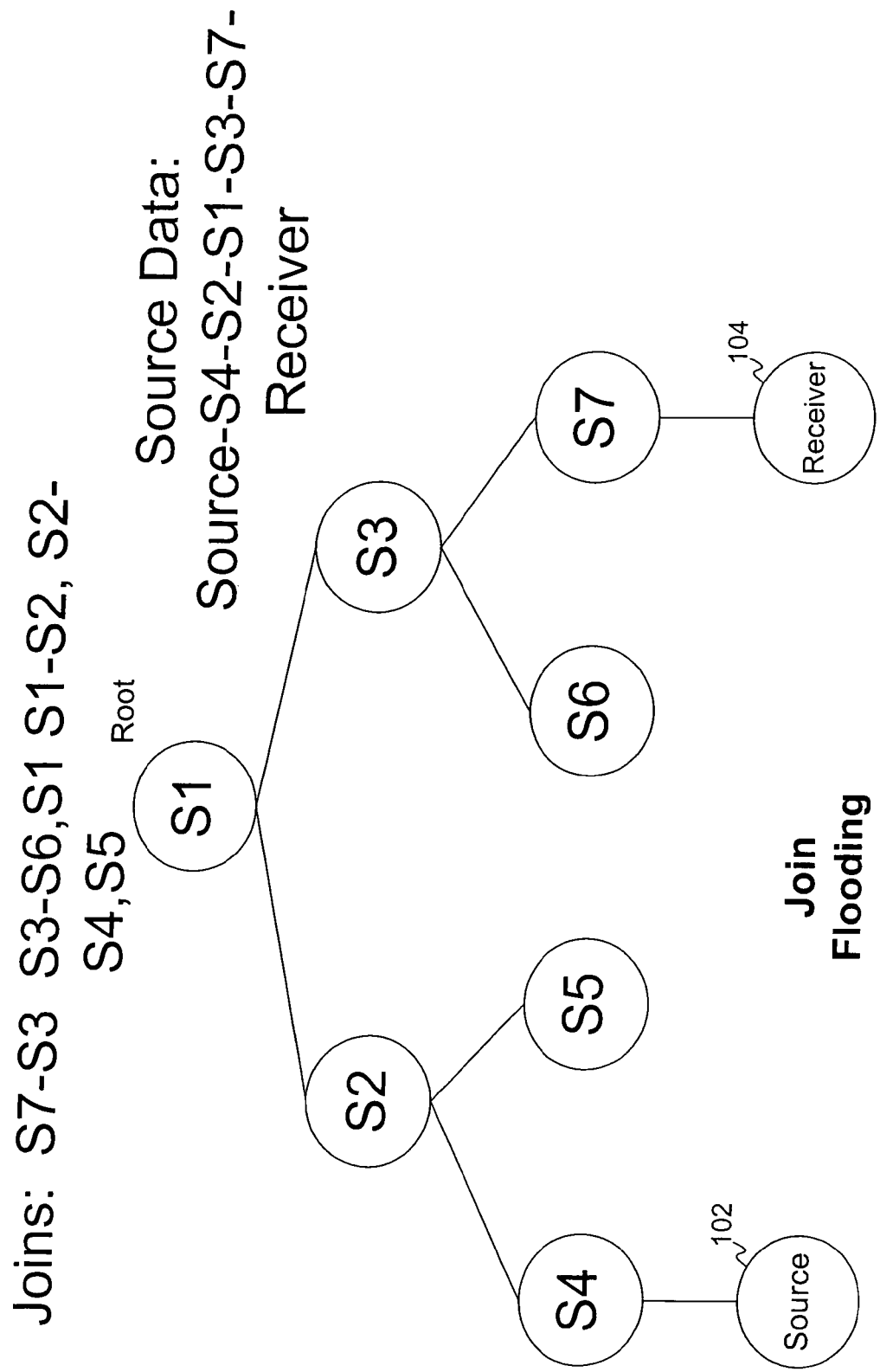
FIG. 3 depicts a spanning tree useful in illustrating a second embodiment of the present invention.

FIG. 3 depicts the spanning tree of FIG. 1 with IGMP Join messages and source data flowing in accordance with this second embodiment. FIG. 4A is a flow chart describing steps of handling a received IGMP Join message in a switch. At step 402, the switch receives an IGMP Join message for G via a port x. At step 404, the switch establishes state for G if no state has already been established. This step is comparable to step 204 in FIG. 2A. At step 406, port x is added to the outgoing port list associated with G's state information.

At step 408, the IGMP Join is flooded towards other switches on the spanning tree. This means that a Join message is sent on each port that participates in the spanning tree other than the port on which the Join message was received. This is not the same as sending the Join message on all ports since some links of a mesh network will not be a part of the spanning tree so as to avoid loops. The operation of the steps of FIG. 4A will cause all switches to become potential accumulation points for group G.

Figure 4B:
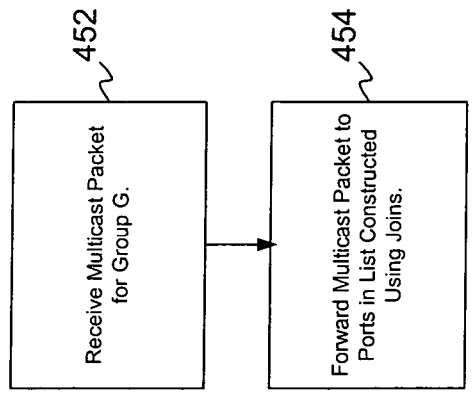
FIG. 4B is a flow chart describing steps of handling a received multicast packet according to a second embodiment of the present invention.
Figure 4A:
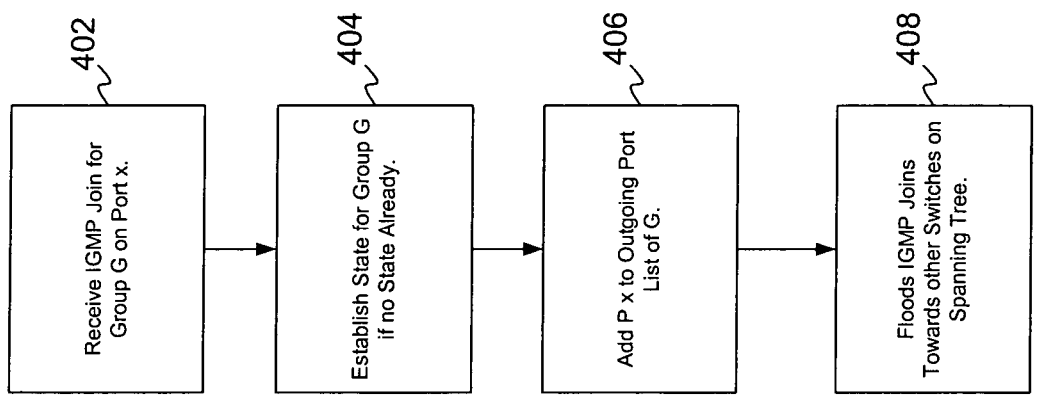
FIG. 4A is a flow chart describing steps of handling a received join message according to a second embodiment of the present invention.

FIG. 4B is a flow chart describing steps of forwarding a multicast packet according to this second embodiment of the present invention. At step 450, the switch receives a multicast packet addressed to G. At step 454, the multicast packet is forwarded to all ports in the outgoing port list described in connection with step 406.

In the example of FIG. 3, a join message from receiver 104 propagates to switch S7, from switch S7 to switch S3, and from switch S3 to both switch S6 and S1. The join message further propagates from switch S1 to switch S2 and from switch S2 to switches S4 and S5. Source data in example of FIG. 3 flows from source 102 through switches S4, S1, S3, and S7 before reaching receiver 104.

Thus when a receiver sends an IGMP Join, state is created on all of the switches of the layer 2 network. Like in the previous example, the state should be kept alive by periodic repeats of the Join message.

When a source starts traffic, the first-hop switch creates data required and switches the traffic as indicated by the outgoing port list. Thus the traffic flows down the link only if there are receivers that are reached via that link Configuring layer 2 networks such that each switch acts as an attraction point provides certain benefits. The flooding of the join messages does not consume much bandwidth since this control traffic is periodic and distribution is constrained by the topology of the spanning tree. Each switch contains substantially the same amount of state information. Link bandwidth is used optimally for data traffic since the data packet is never sent on a link unnecessarily. State information is created in advance and is ready to be used when a data packet arrives, leading to nearly zero latency. (It is possible to commit state to hardware once data traffic actually arrives.) Again, there is no need to involve a layer 3 router or layer 3 multicast protocol like PIM.

First-Hop Switch as Attraction Point

Figure 5:
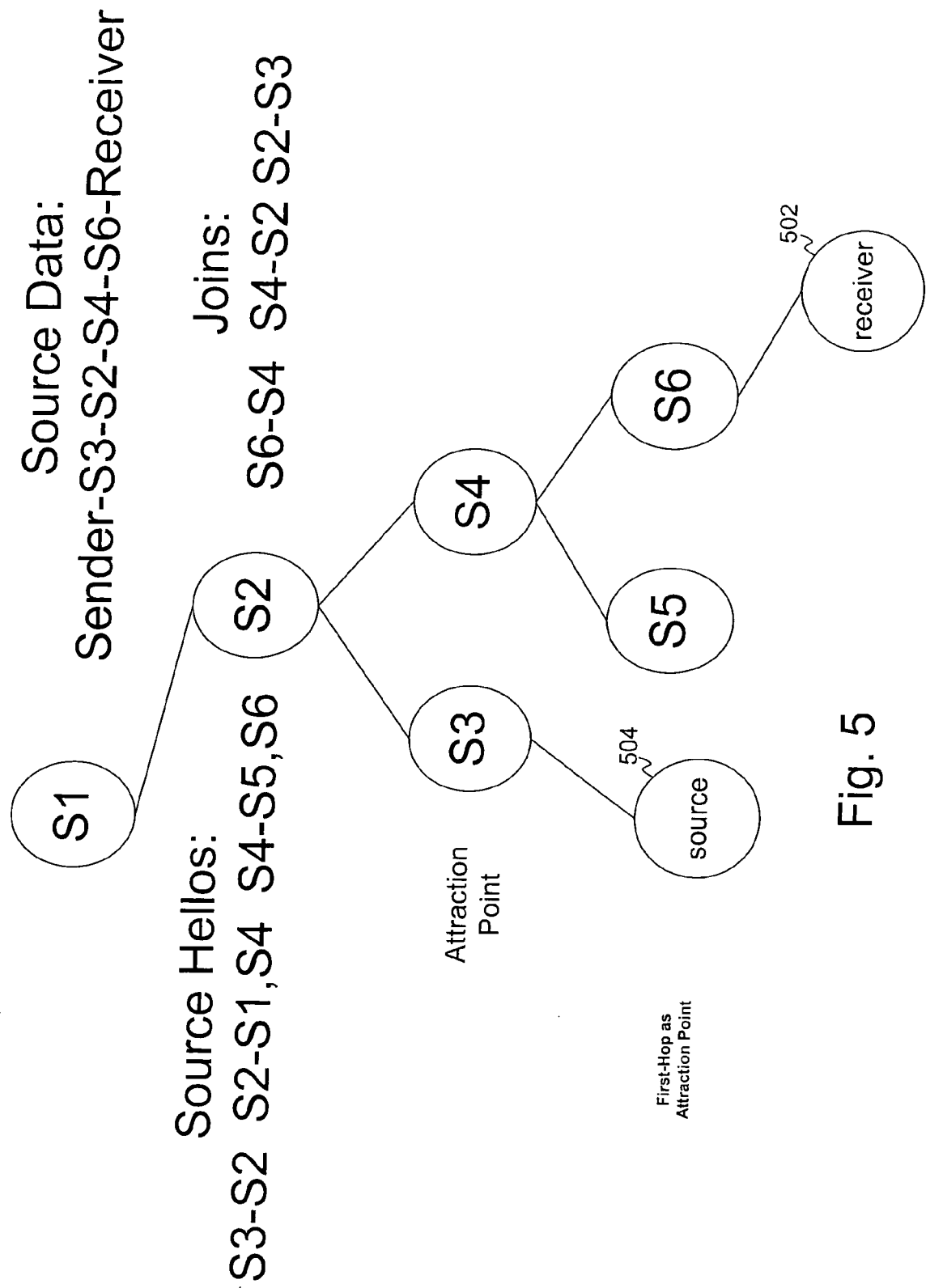
FIG. 5 depicts a spanning tree useful in illustrating a third embodiment of the present invention.

In a third embodiment, a switch directly connected to the source acts as the attraction point. This switch floods an advertisement message announcing itself as attraction point to all switches in the layer 2 network. IGMP Joins are forwarded towards this attraction point. Multicast data traffic is forwarded to all ports on which a join is received and thus finds its way to the receiver. FIG. 5 depicts a spanning tree useful in illustrating this third embodiment of the present invention. A receiver 502 is interested in multicast traffic assigned to G. Some of this traffic is provided by a source 504. The attraction point has a switch directly connected to source 504, switch S3. As soon as source 504 starts transmitting multicast data for group G, the first-hop switch S3 detects the data traffic and floods advertisement packets referred to as Source Hellos (SHs) to all the other switches via the spanning tree. The Source Hello packets contain the source IP address of the sender and the multicast group address of G. The Source Hellos are flooded periodically via the spanning tree. Each switch maintains two port lists for every flow G for which it maintains state information: a source port list and an outgoing port list.

Figure 6C:
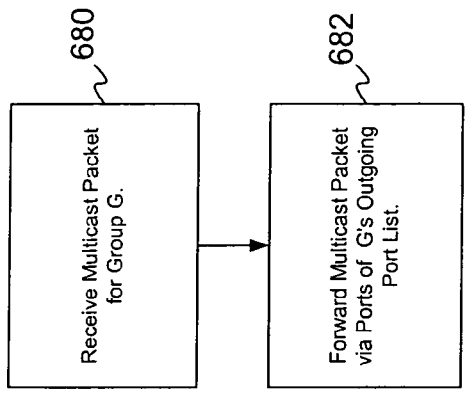
FIG. 6C is a flow chart describing steps of handling a received multicast packet according to a third embodiment of the present invention.
Figure 6B:
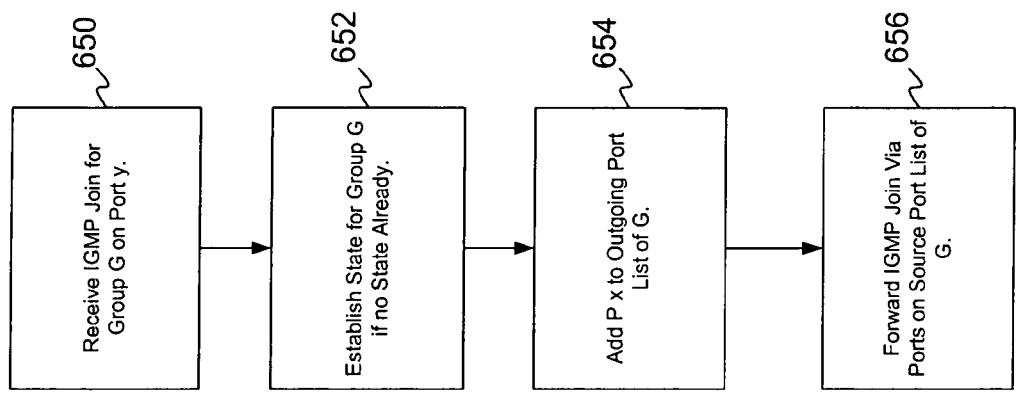
FIG. 6B is a flow chart describing steps of handling a received join message according to a third embodiment of the present invention.
Figure 6A:
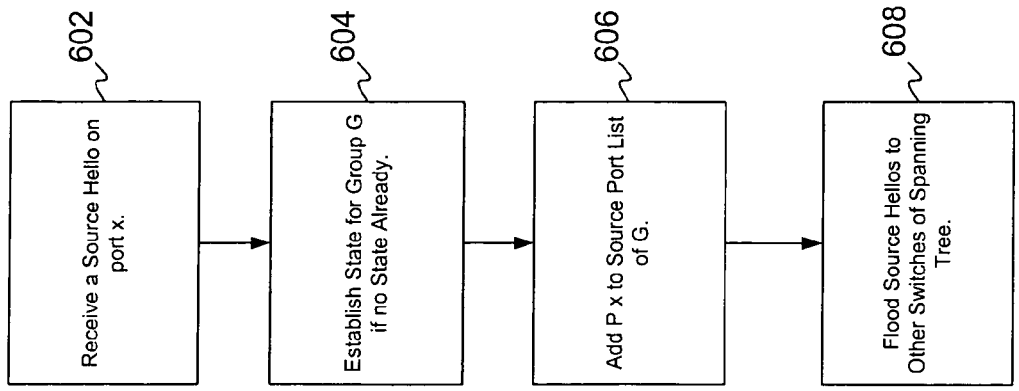
FIG. 6A is a flow chart describing steps of handling a received advertisement message according to a third embodiment of the present invention.

FIG. 6A is a flow chart describing steps of handling a received Source Hello according to this third embodiment of the present invention. At step 602, a switch receives a Source Hello message identifying group G on a port x. At step 604, the switch establishes state for G if no such state exists already. As indicated before, associated with the state information for G is a source port list. At step 606, the switch adds port x to the source port list associated with G. At step 608, the switch floods the received Source Hello to the other switches of the spanning tree. Accordingly, the Source Hello is sent on every port connected to a link of the spanning tree other than the port on which the Source Hello was received. Referring now again to FIG. 5, a Source Hello in that example would flow from S3 to S2, then from S2 to S1 and S4, and then from S4 to S5 and S6.

FIG. 6B is a flow chart describing steps of handling a received IGMP Join message according to this third embodiment of the present invention. At step 650, a switch receives an IGMP Join message for group G on port y. At step 652, the switch establishes state information for G if no state exists already. At step 654, port y is added to the outgoing port list associated with G. At step 656, the switch forwards the IGMP Join message but only via the ports that are on the source port list of G. Referring again to FIG. 5, the path taken by a Join message in that example would be from S6 to S4, from S4 to S2, and from S2 to S3.

FIG. 6C is a flow chart describing steps of forwarding a multicast packet according to this third embodiment of the present invention. At step 680, a switch receives a multicast packet addressed to G. At step 682, the switch forwards the multicast packet but only via ports on the outgoing port list associated with G. Referring again to the example of FIG. 5, a multicast data packet would flow from the source 504 to receiver 502 via switches S3, S2, S4, and S6. Note that S5 and S1 do not receive multicast data packets when traffic flows in this way.

The Source Hello messages effectively build a distribution tree rooted at the source. All Joins flow up the distribution tree towards the source. The source then forwards the data packets through only those branches in the tree which have interested receivers.

This solution also has benefits. The Source Hello messages efficiently build up a multicast distribution tree. The use of a loop-free spanning tree provided by the operative Spanning Tree Protocol allow flooding of join messages without worry about routing loops. Since the Source Hellos are only sent periodically, flooding them does not consume undue bandwidth. Forwarding of multicast data traffic is optimal since a data packet is never sent via a branch which does not have any interested receivers.

Forwarding state is created only in those switches on the optimal path between a source and a receiver. Also, state is created only upon receipt of a Source Hello. Since the number of active sources is typically small, the total amount of state information that must be maintained is also very small. Like with the previous embodiments, there is no need to employ a layer 3 router.

Spanning Tree Changes

If the underlying layer 2 spanning tree changes, the multicast distribution tree will adapt. For all of the cases described above, periodic join messages generated after the topology change will cause the multicast distribution tree to adapt. If the root bridge is the attraction point, a change of the root bridge will cause further Join messages to propagate toward the new root bridge, taking into account the modified spanning tree. Data traffic from the source is also sent to the new root bridge. Alternatively, a topology change can trigger immediate generation of new Join messages rather than waiting for the next periodic transmission.

Network Device Details

Figure 7:
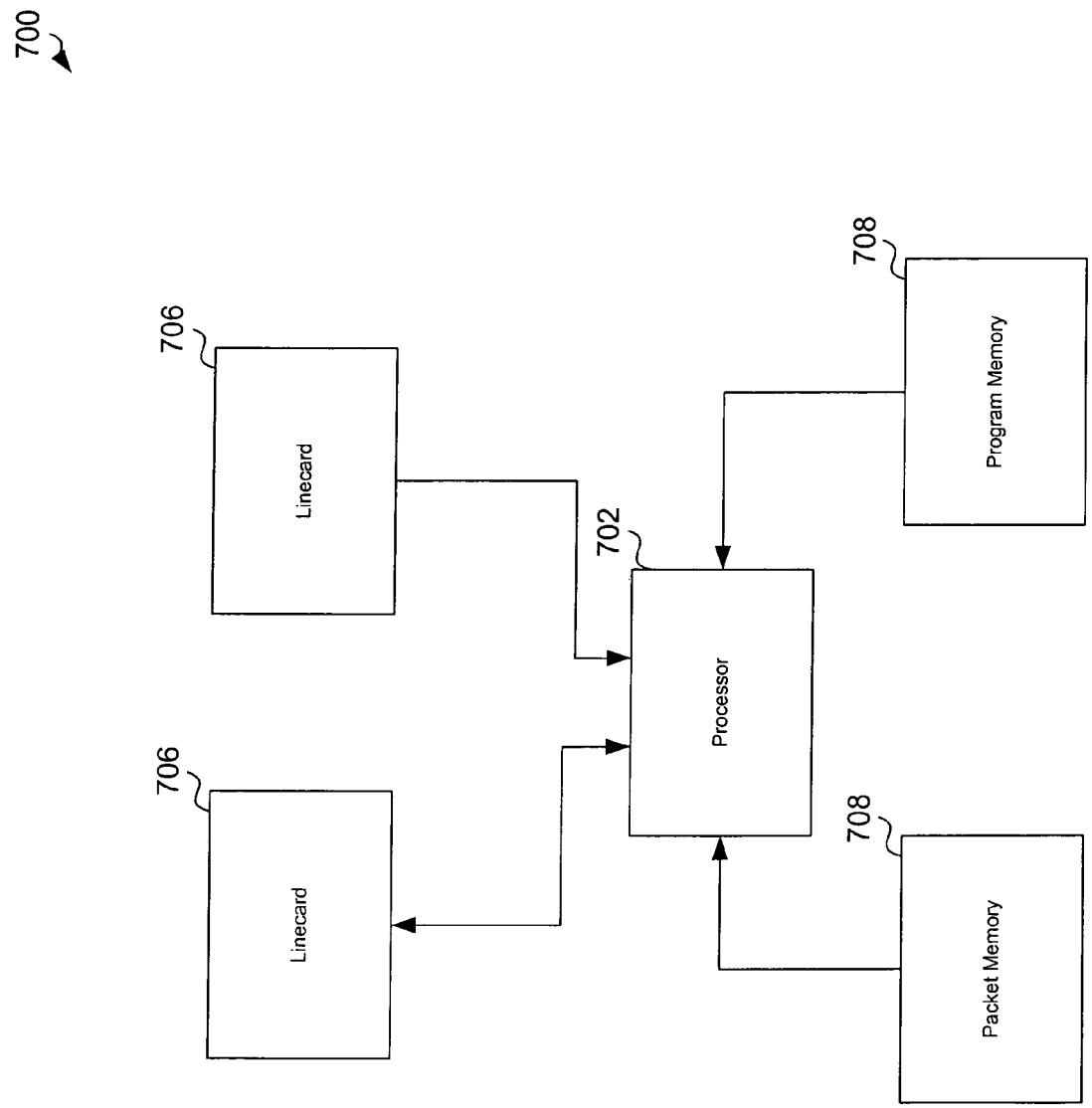
FIG. 7 depicts a network device useful in implementing embodiments of the present invention.

FIG. 7 depicts a network device 700 that may be used to implement, e.g., any of the nodes of FIGS. 1, 3, and 5 and/or perform any of the steps of FIGS. 2A-2B, 4A-4B, and 6A-6C. In one embodiment, network device 700 is a programmable machine that may be implemented in hardware, software or any combination thereof. A processor 702 executes code stored in a program memory 704. Program memory 704 is one example of a computer-readable medium. Program memory 704 can be a volatile memory. Another form of computer-readable medium storing the same codes would be some type of non-volatile storage such as floppy disks, CD-ROMs, DVD-ROMs, hard disks, flash memory, etc. A carrier wave that carries the code across a network is another example of a computer-readable medium.

Network device 700 interfaces with physical media via a plurality of linecards 706. Linecards 306 may incorporate Ethernet interfaces, DSL interfaces, Gigabit Ethernet interfaces, 10-Gigabit Ethernet interfaces, SONET interfaces, etc. As packets are received, processed, and forwarded by network device 700, they may be stored in a packet memory 708. Network device 700 implements all of the network protocols and extensions thereof described above as well as the data networking features provided by the present invention.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a node in a layer 2 network to handle multicast traffic, said method comprising:
   receiving at a switch within said layer 2 network, via a first port, an Internet Group Management Protocol (IGMP) join message for a multicast distribution group, said IGMP join message received from a neighbor switch in said layer 2 network;
   establishing multicast state information at the switch for said multicast distribution group based on said join message, if such state information has not already been established;
   adding said first port to a port list associated with said state information at the switch, said port list being used to select ports for forwarding received multicast traffic of said multicast distribution group;
   forwarding said IGMP join message from the switch towards an attraction point of said layer 2 network via a spanning tree defined within said layer 2 network, wherein the attraction point is a root bridge and layer 2 switch in said layer 2 network, and said IGMP join messages are forwarded from the switch towards the attraction point without the use of layer 3 routers;
   receiving at the switch, multicast traffic addressed to said multicast distribution group and transmitted from the attraction point; and
   forwarding said multicast traffic via a multicast distribution tree formed based on said spanning tree, wherein forwarding said multicast traffic comprises forwarding said multicast traffic towards the root bridge via a port selected according to said spanning tree, the root bridge located at a root of said spanning tree.

2. The method of claim 1 wherein forwarding said join message comprises: flooding said join message via said spanning tree of said layer 2 network.

3. The method of claim 1 wherein forwarding said join message comprises: forwarding said join message via one or more ports via which an attraction point advertisement message was previously received.

4. The method of claim 1 wherein forwarding said multicast traffic comprises: forwarding said multicast traffic via one or more ports via which said join message was received earlier.

5. A method for operating a node in a layer 2 network to handle multicast traffic, said method comprising:
   receiving multicast traffic at a switch within said layer 2 network, from a neighbor node in said layer 2 network, said multicast traffic being addressed to a multicast distribution group having a media access control address assigned thereto; and
   forming at the switch a multicast distribution tree based on a spanning tree defined within said layer 2 network;
   in response to said multicast traffic, flooding an advertisement message throughout said layer 2 network via said spanning tree of said layer 2 network, said advertisement message establishing said node as an attraction point for said multicast distribution group;
   wherein said advertisement message comprises an IP address of the neighbor node and said media access control address assigned to said multicast distribution group; and
   wherein the attraction point is a root bridge and layer 2 switch to which all Internet Group Management Protocol (IGMP) join messages for said multicast distribution group are forwarded via a multicast distribution tree without the use of layer 3 routers.

6. A non-transitory computer-readable storage medium for use in operating a node in a layer 2 network to handle multicast traffic, said storage medium located at a switch in said layer 2 network and having stored thereon:
   code that causes reception within said layer 2 network of, via a first port, an Internet Group Management Protocol (IGMP) join message for a multicast distribution group, said IGMP join message received from a neighbor switch in said layer 2 network; code that causes establishment of multicast state information for said multicast distribution group based on said join message, if such state information has not already been established;

code that causes addition of said first port to a port list associated with said state information, said port list being used to select ports for forwarding received multicast traffic of said multicast distribution group;

code that causes forwarding said IGMP join message towards an attraction point of said layer 2 network via a spanning tree of said layer 2 network, wherein the attraction point is a root bridge and layer 2 switch in said layer 2 network, and said IGMP join messages are forwarded from the switch towards the attraction point without the use of layer 3 routers;

code that causes reception at the switch of multicast traffic address to said multicast distribution group and transmitted from the attraction point; and code that causes forwarding multicast traffic via a multicast distribution tree formed based on said spanning tree, wherein forwarding said multicast traffic comprises forwarding said multicast traffic towards the root bridge via a port selected according to said spanning tree, the root bridge located at a root of said spanning tree.

7. The storage medium of claim 6 wherein code that causes forwarding said join message comprises:

code that causes flooding of said join message via said spanning tree of said layer 2 network.

8. The storage medium of claim 6 wherein code that causes forwarding said join message comprises:

code that causes forwarding of said join message via one or more ports via which an attraction point advertisement message was previously received.

9. The storage medium of claim 6 wherein code that causes forwarding of said multicast traffic comprises:

code that causes forwarding of said multicast traffic via one or more ports via which said join message was received earlier.

10. A non-transitory computer-readable storage medium for use in operating a node in a layer 2 network to handle multicast traffic, said storage medium located at a switch in said layer 2 network and having instruction stored thereon, said instructions comprising:

code that causes reception of multicast traffic from a neighbor node in said layer 2 network, said multicast traffic being addressed to a multicast distribution group having a media access control address assigned thereto; and code that causes forming a multicast distribution tree based on a spanning tree defined within said layer 2 network;

code that causes, in response to said multicast traffic, flooding of an advertisement message throughout said layer 2 network via a spanning tree of said layer 2 network, said advertisement message establishing said node as an attraction point for said multicast distribution group;

wherein said advertisement message comprises an IP address of the neighbor node and said media access control address assigned to said multicast distribution group; and wherein the attraction point is a root bridge and layer 2 switch to which all Internet Group Management Protocol (IGMP) join messages for said multicast distribution group are forwarded via a multicast distribution tree without the use of layer 3 routers.

11. Apparatus for operating a node in a layer 2 network to handle multicast traffic, said apparatus comprising a switch within said layer 2 network, the switch comprising:

a processor that executes instructions; and a memory device that stores said instructions, said instructions comprising:

code that causes reception within said layer 2 network of, via a first port, an Internet Group Management Protocol (IGMP) join message for a multicast distribution group, said IGMP join message received from a neighbor switch in said layer 2 network; and code that causes establishment of state information for said multicast distribution group based on said join message, if such state information has not already been established;

code that causes addition of said first port to a port list associated with said state information, said port list being used to select ports for forwarding received multicast traffic of said multicast distribution group;

code that causes forwarding said IGMP join message towards an attraction point said layer 2 network via a spanning tree defined within said layer 2 network, wherein the attraction point is a root bridge and layer 2 switch in said layer 2 network, and said IGMP join messages are forwarded from the switch towards the attraction point without the use of layer 3 routers;

code that causes reception at the switch of multicast traffic addressed to said multicast distribution group and transmitted from the attraction point;

code that causes forwarding multicast traffic via a multicast distribution tree formed based on said spanning tree, wherein forwarding said multicast traffic comprises forwarding said multicast traffic towards the root bridge via a port selected according to said spanning tree, the root bridge located at a root of said spanning tree.

12. The method of claim 1 wherein a media access control address is assigned to said multicast distribution group.

13. The method of claim 5 further comprising periodically flooding said advertisement via said spanning tree.

14. The method of claim 5 further comprising maintaining a source port list and an outgoing port list for each flow of said multicast traffic.

15. The apparatus of claim 11 wherein said code that causes forwarding of said join message comprises code that causes flooding of said join message via said spanning tree of said layer 2 network.

16. The apparatus of claim 11 wherein code that causes forwarding said join message comprises: code that causes flooding said join message via said spanning tree of said layer 2 network.

17. The apparatus of claim 11 wherein code that causes forwarding of said join message comprises: code that causes forwarding of said join message via one or more ports via which an attraction point advertisement message was previously received.

18. The apparatus of claim 11 wherein code that causes forwarding of said multicast traffic comprises: code that causes forwarding of said multicast traffic via one or more ports via which said join message was received earlier.

* * * * *